(12) United States Patent
Mueller et al.

(10) Patent No.: US 8,737,391 B2
(45) Date of Patent: May 27, 2014

(54) SWITCHING MATRIX AND METHOD FOR SPECIFYING A SWITCHING MATRIX

(75) Inventors: Goetz Mueller, Weissach im Tal (DE); Martin Goetzer, Backnang (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 584 days.

(21) Appl. No.: 12/672,618

(22) PCT Filed: Aug. 6, 2007

(86) PCT No.: PCT/EP2007/058150
§ 371 (c)(1),
(2), (4) Date: Dec. 21, 2010

(87) PCT Pub. No.: WO2009/018855
PCT Pub. Date: Feb. 12, 2009

(65) Prior Publication Data
US 2011/0090905 A1  Apr. 21, 2011

(51) Int. Cl.
*H04L 12/28* (2006.01)
(52) U.S. Cl.
USPC .............. 370/360; 710/316; 379/242

(58) Field of Classification Search
USPC .......................... 370/360, 380, 372; 365/174
See application file for complete search history.

(56) References Cited

U.S. PATENT DOCUMENTS

| | | | |
|---|---|---|---|
| 6,914,902 B2 * | 7/2005 | Ayandeh | 370/380 |
| 7,440,448 B1 * | 10/2008 | Lu et al. | 370/380 |
| 2007/0291535 A1 * | 12/2007 | Eberle et al. | 365/174 |

FOREIGN PATENT DOCUMENTS

| | | |
|---|---|---|
| WO | WO 2007/060195 | 5/2007 |
| WO | WO 2007/060196 | 5/2007 |
| WO | WO 2007/060197 | 5/2007 |
| WO | WO 2008/055540 | 5/2008 |
| WO | WO 2008/071228 | 6/2008 |
| WO | WO 2008/074363 | 6/2008 |

\* cited by examiner

*Primary Examiner* — Wei Zhao
*Assistant Examiner* — Lionel Preval

(57) ABSTRACT

A method of specifying a switching matrix over a Beneš network involves specifying a first number of ingress ports and a second number of egress ports for the matrix. Switching elements and connections between the switching elements are configured to the number of ports, and the matrix is subdivided into a plurality of sections. The switching elements and ports are moved and/or turned to obtain certain configurations, but connections are retained.

9 Claims, 6 Drawing Sheets

S1 – S7 correspond to stages 1 through 7

SWITCHING MATRIX AND METHOD FOR SPECIFYING A SWITCHING MATRIX

TECHNICAL FIELD

The present invention relates to a method for specifying a switching matrix. Devices and software programs embodying the invention are also described.

BACKGROUND

Current telecommunications networks supply a variety of telecommunications services to customers, for example via a Multi-Service Access Node (MSAN). The provided services can comprise for example Plain Old Telephone Services (POTS), Digital Subscriber Lines (DSL) or Integrated Services Digital Network (ISDN) lines. The services are supplied via customer subscriber lines, for example copper cables, connected to a customer Main Distribution Frame (MDF). The Main Distribution Frames play a vital role in an operator network as a result of the investments required to create a geographically distributed access network supporting the delivery of the services to the subscribers. The access network is a significant asset and any change to the architecture drives significant incremental cost. Correspondingly, the costs of implementing new technical solutions in the access network are high and appropriate solutions are often not available on the market.

Traditionally, the number of required reconfigurations per time period was relatively low in the access network. Increased competition, regulatory changes, and the introduction of new services are now driving more reconfigurations. Greater numbers of competitive operators taking advantage of Local Loop Unbundling and the evolution of new broadband xDSL services are increasing the rate at which subscribers either change their service or change from one operator to another. Greater pressure is also placed on access network operators as the location of network devices such as a DSLAM (Digital Subscriber Line Access Multiplexer) is moving from the central office to the MDF as primary connection point, i.e. the location where links from the central office are connected to the links to the individual subscribers. This is due to the requirement to reduce connection lengths so that high bit rate services such as ADSL2+ or VDSL2 can be supported for which the rate drops significantly with increasing connection length between subscriber equipment and DSLAM.

The customer MDF is usually located in a service box near to the customers premises. An MSAN is connected to a provider MDF which is also located in the service box. To supply a particular telecommunications service to a customer the service provider must make connections between the customer MDF and the provider MDF. Such connections are typically made manually by a service engineer who must visit the service box and make the connections. New connections are required to be made each time a new service is provided to a customer or an existing service is changed. The problem is to manage physical connections for the services available to the customers, in particular for a big number of customers, e.g. if new customers or new services are added, or when old customers change the service package or terminate one or more services. All these changes traditionally require a visit of the field engineer at the service box. With regard to the huge number of such service boxes deployed servicing of them and maintaining high responsiveness to customers' requests is both expensive and time consuming.

The cost of making the connections has two main components. The first is the fixed cost of providing the equipment to make the connection. The second is the overhead cost associated with the requirement for the service engineer to visit the service box and make the connection. Service providers aim to minimize both of these costs. The overhead cost can be reduced by waiting until there are several connections to be made at the service box at the same time. This has the drawback that a customer may have to wait for the service to be connected. Typically about 5-10% of customer connections are changed per year, which means that 90-95% of connections remain unchanged. Therefore, waiting to providing new services to customers is often not a feasible option. Alternatively service providers can minimize the overhead cost by including a switching matrix between the customer MDF and the provider MDF which allows automated connections to be made from a remote location.

Switching matrixes used for such automated or remote provisioning comprise cross bar, Beneš or Clos networks. Beneš networks consist of a plurality of stages of interconnected switching elements which allow connecting ingress and egress ports of the switching matrix over paths which can be changed according to the states of the individual switching elements. Cross bar, Beneš and Clos networks can provide non-blocking functionality. Whereas cross bar and Beneš network are non-blocking, a Clos network can be either blocking, non-blocking or non-blocking after reconfiguration. One problem associated with the cross bar is the initial cost of deployment which increases the fixed costs because the number of cross bars increases with a square relationship between the number of cross bars and the number of cross paints.

A problem in existing networks is that the number of connections to the MDF is specified by the existing cables and the switching matrix needs an according number of ingress and egress ports. For example, the cable from the provider MDF to the central office of the operator may have 100 lines and the customer MDF may be designed for the connection to 100 lines to the subscribers. In contrast, a Beneš network comprising 2×2 switching elements is suitable to connect $2^n$ ingress ports with $2^n$ egress ports where n is an integer. For numbers of ingress and egress ports which deviate from integer powers of 2, the number of switching elements can be reduced without loss of functionality, e.g. the non-blocking properties, in order to save space and costs for the switching matrix. Accordingly, the corresponding network can be called a reduced Beneš network. However, the reduced number of ports and switching elements causes an asymmetry in the switching matrix. This leads to increased production costs, in particular if the size of the switching matrix requires a subdivision onto a plurality of different circuit boards.

SUMMARY

In view of the above disadvantages it is an object to provide a switching matrix which can effectively be produced and a method for specifying such a switching matrix.

In the proposed method, a switching matrix is specified for connecting selected ingress ports to selected egress ports over a Beneš network. The Beneš network comprises a plurality of interconnected switching elements. Each switching element has at least one input and at least one output and is adapted to connect a selected input to a selected output of the switching element. The switching elements are arranged in stages. The at least one input of any of the switching elements has a connection to the at least one output of one of the switching elements in a preceding stage or to one of the ingress ports.

The at least one output of any of the switching elements has a connection to the at least one input of one of the switching elements in a subsequent stage or to one of the egress ports.

A first number of ingress ports and a second number of egress ports of the switching matrix are specified, at least one of said numbers deviating from an integer power of 2 or from the other number. The number of the switching elements and the number of the connections between the switching elements are adapted to the specified numbers of ports. The switching matrix is subdivided into a plurality sections.

The switching elements and the ports are moved such that at least two of the sections comprise an equal number and arrangement of the switching elements and an equal number and arrangement of the ports, wherein the connections are retained. In at least one of the at least two sections, switching elements having a connection to a switching element in another of the plurality of sections are turned such that the positions of the inputs are interchanged and/or the positions of the outputs are interchanged. The connections of the turned switching elements to other switching elements are retained if the other switching elements are disposed in a stage in which at least one switching element is turned. The connections of the turned switching elements to other switching elements are swapped if the other switching elements are disposed in a stage in which no switching element is turned. The steps of turning and swapping are performed such that the arrangements of the connections within the at least two sections correspond to each other.

Furthermore, the invention is embodied in a switching matrix as described below, and in a circuit board as described below. Advantageous embodiments are also described below.

The invention can also be embodied in a program used in the execution of the method. The program is for example stored on a data carrier or loaded into a processing system of a computer.

The foregoing and other objects, features and advantages of the present invention will become more apparent in the following detailed description of preferred embodiments as illustrated in the accompanying drawings.

DETAILED DESCRIPTION

Figure 1:
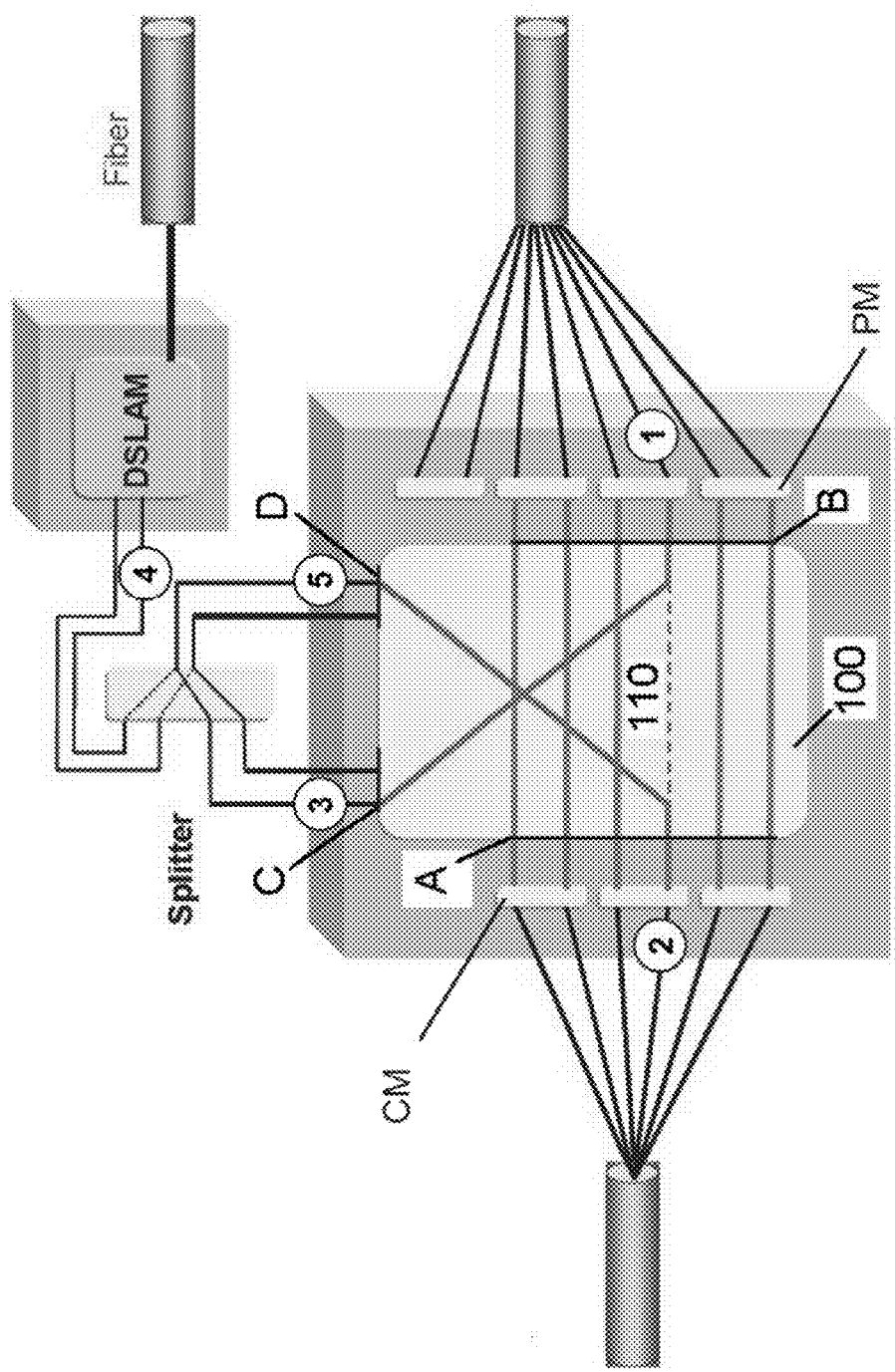
FIG. 1 shows an example of connecting subscriber lines using a switching matrix

An example of providing different services over a switching matrix to a subscriber line is shown in FIG. 1. A main cable to the central office with a plurality of central lines 1 is connected over a provider main distribution frame PM to the switching matrix 100. Furthermore, the switching matrix 100 is connected over a customer main distribution frame CM to a plurality of subscriber lines 2.

For simplicity only external interfaces of the switching matrix 100 are indicated which allow connecting the switching matrix to other devices. For example, interface A can be used to connect individual subscriber lines with the switching matrix. Interface B can connect the switching matrix to other nodes in the operators' network, for example to a switching node. Interfaces C and D allow to connect different ports of the switching matrix with each other. One or more splitters in the interconnections can provide access to other services, for example to broadband access using a DSLAM. It is also possible to interconnect a plurality of switching matrixes over the interfaces.

Correspondingly, switching matrix 100 can be used for subscriber line exchange, i.e. to connect subscriber lines in a flexible way to nodes in the operator network, to provide access to services and to rearrange these connections and accesses in a flexible way. Preferably, the switching matrix 100 is also provided with an interface for remotely performing the subscriber line exchange by remotely changing the paths through the switching matrix.

The switching matrix 100 comprises external ports which are denoted as ingress and egress ports throughout this specification. However, it should be noted that it is not relevant for the present invention whether a particular port is an ingress or egress port. The ports correspond to the external interfaces A-D of the switching matrix 100. The switching matrix comprises furthermore a plurality of interconnected switching elements, which can comprise for example relays, motor-based sliders, or micromechanical switches. Relays are especially suited for tough environments, e.g. outdoor applications, as they tolerate temperature changes, vibration and humidity. Relays have also short switching times, high voltage endurance as well as low attenuation and cross-talk. The interconnected switching elements provide the paths through the switching matrix which connect selected ingress to selected egress ports. For a remote service adaptation, the states or settings of the switching elements and thus the paths can preferably remotely be changed.

The example of FIG. 1 shows how an additional service can be provided to a subscriber line. A selected subscriber line 2 arriving at the customer MDF CM is originally connected via path 110 to a selected central line 1. When the subscriber of the line 2 wants to have also DSL access as an example for the additional service, original path 110 is changed to a new path. The broken line represents a removed segment of the original path. Instead of the removed segment, new segments of the path are switched to interfaces C and D of the switching matrix 100. Interfaces C and D are connected to the inlet 3 and outlet 5 of a splitter. The splitter is connected with a further path segment 4 to a DSLAM for providing a DSL service via optical fibers. Thus the services provided to a subscriber can be easily adapted by controlling the switching elements and thus the paths through the switching matrix.

A plurality of services can be provided to any selected subscriber line 2 in this way. It is both possible to connect one or more additional services to a subscriber line via splitters, e.g. on interfaces C and D, and to connect the subscriber lines to central lines 1 which terminate in specific MDFs for the respective service in the central office, e.g. providing POTS service, ISDN, integrated narrow- and broadband like ISDN/ADSL or leased lines. As indicated, the arrangement can connect different access technologies underlying the services. For example, lines 1 and 2 can be copper pairs while the DSLAM connects to optical fibers.

Figure 2:
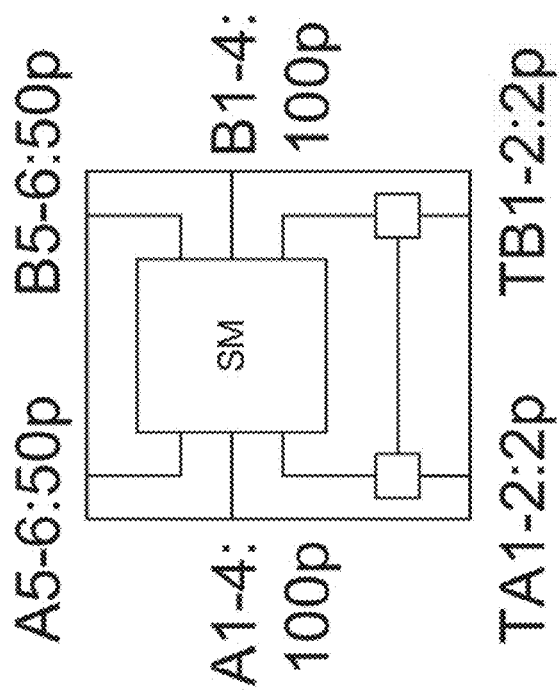
FIG. 2 shows an example for ingress and egress ports of a switching matrix

FIG. 2 shows an example for ingress and egress ports of a switching matrix SM. In the example of FIG. 2, the ingress ports are denoted with an A and the egress ports are denoted with a B. 100 ports in four groups of 25 ports A1-4 and B1-4 on each side allow for example the connection of subscriber lines to the switching matrix SM and the connection of 100 lines of one or more central cables, e.g. to a central office or switching node of an operator. 50 further lines on each side allow for example the connection to splitters or distribution matrixes so that a part of the subscriber lines can be provided with additional services. Finally, there are also 2 ports for testing purposes TA and TB on each of the sides. As a result, the depicted switching matrix has a total of 152 ingress ports and 152 egress ports.

Figure 3:
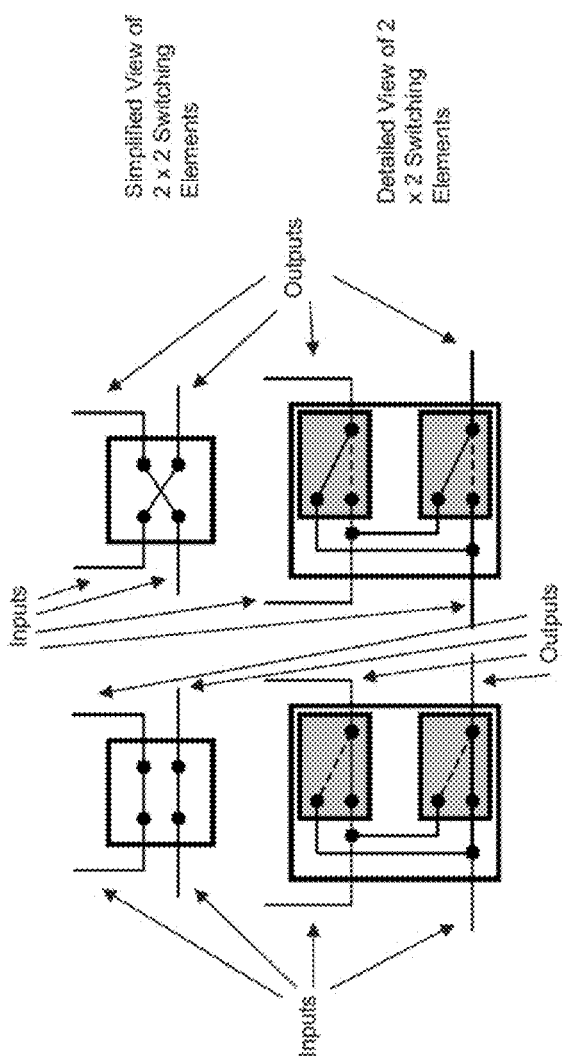
FIG. 3 shows switching states of a switching element

FIG. 3 shows two switching states of a 2×2 switching element as it can be used in a switching matrix for switching different connections and paths. The switching element is indicated by a square and has two inputs on one side and two outputs on the other side. As it is not relevant if a contact of the element is an input or an output, they are not distinguished in the figure. In a first state on the left side of FIG. 3, the switching element connects the upper input with the upper output and the lower input with the lower output, i.e. both inputs are connected in parallel to the corresponding output. In a second state shown on the right side of FIG. 3, the switching element connects the upper input with the lower output and the lower input with the upper output, i.e. the inputs are cross-connected to the respective other output. The upper part of FIG. 3 shows simplified representations of the switching states while the lower part indicates how these states can be realized with change-over contacts, for example relays.

The interconnection of any ingress port to any egress port of a switching matrix can be realized with a Beneš network consisting of interconnected 2×2 switching elements. An advantage of a Beneš network are the non-blocking properties, i.e. a path between any selected ingress and egress port of the switching matrix can be switched as long as the respective ports are still free regardless of other paths already switched through the network. In contrast, paths in a blocking network may also block connections to ports to which they are not connected.

The number of ingress and egress ports in a regular Beneš network is an integer power of 2, i.e. $2^n$ with n being an integer. If a regular Beneš network shall be used to connect other arbitrary numbers of ports, the number of ports in the regular Beneš network must be at least equal to the maximum of the arbitrary number of ingress ports and the arbitrary number of egress ports. For connecting a first number of ingress ports to a first number of egress ports, a regular Beneš network is thus required in which $2^n$ is at least equal to the first number. In the example depicted in FIG. 2, the regular Beneš network would thus have 256 ingress and 256 egress ports. However, because only some of these ports are used in the switching matrix of FIG. 2, the number of ports and switching elements can be reduced to obtain a reduced Beneš network without changing the number of possible paths from ingress ports to egress ports through the network as it is shown in following table 1.

TABLE 1

Example of a reduced switching matrix

| | | |
|---|---|---|
| m_A | 152 | number of ingress ports |
| m_B | 152 | number of egress ports |
| n | 256 | number of ingress/egress ports if mapped to regular Beneš network |
| L | 15 | number of stages of Beneš network |
| K_max | 3840 | number of relays of totally equipped regular Beneš network |
| K_saved | 1344 | number of saved relays |
| K_required | 2496 | number of required relays for m_A/m_B ports |
| s_A, i | | number of saved relays in ith stage counted from ingress |
| R_A, i | | number of saved relays in completely removed elements in ith stage counted from ingress |
| s_B, i | | number of saved relays in ith stage counted from egress |
| R_B, i | | number of saved relays in completely removed elements in ith stage counted from egress |

TABLE 1-continued

| i | s_A | r_A | s_B | r_B |
|---|---|---|---|---|
| Saved ports | | 104 | | 104 |
| 1 | 104 | 104 | 104 | 104 |
| 2 | 104 | 104 | 104 | 104 |
| 3 | 104 | 104 | 104 | 104 |
| 4 | 104 | 96 | 104 | 96 |
| 5 | 96 | 96 | 96 | 96 |
| 6 | 96 | 64 | 96 | 64 |
| 7 | 64 | 0 | 64 | 0 |
| 8 | 0 | 0 | 0 | 0 |

For reducing the number of ports and switching elements, the switching matrix is mapped onto the smallest regular Beneš network which can accommodate the reduced Beneš network of the switching matrix. The ports of the switching matrix are arranged in such a way on the regular Beneš network that the number of switching elements is maximized in which both inputs are connected to ingress ports or both outputs are connected to egress ports. As a result, other switching elements in the ingress and egress stages of the switching matrix are not connected to any ingress or egress port, respectively. Switching elements in the input and output stage which are not connected to an ingress or egress port, respectively, are removed. Then in every subsequent stage until the center stage of the Beneš network is reached, the number of switching elements is maximized in which both inputs are connected to switching elements in the preceding stage toward the ingress side. From the egress side in every subsequent stage until the center stage of the Beneš network is reached, the number of switching elements is maximized in which both outputs are connected to switching elements in the preceding stage toward the egress side. Switching elements without connections to the respective preceding stage are removed. Table 1 shows the number of elements which can be saved compared to a regular Beneš network both in each stage and in total.

In case that a switching element has one input connection and two output connections or two input connections and one output connection, it can be replaced by a 2×1 switching element in which the single input can alternatively be connected to both outputs or the single output alternatively to the inputs. This can also decrease the production costs by using simpler switching elements. In particular, a 2×2 switching element can comprise two relays as shown in FIG. 3 while a 2×1 switching element can be a single relay. A switching matrix SM with 2496 relays in 15 stages can thus be obtained in the case of Table 1 and FIG. 2.

This procedure can also be illustrated for a regular Beneš network with 56 switching elements in seven stages S1-S7, each stage in the equivalent regular Beneš network consisting of 8 switching elements. Such a switching matrix is shown on the left side of FIGS. 5 and 6. It is assumed that twelve connections are required in the outermost stages S1, S7 for connecting towards the ports of the switching matrix. In contrast, the corresponding regular Beneš network has 16 ingress and 16 egress ports. As only twelve ingress and egress ports are required, two switching elements SE can be removed in the outermost stages S1, S7 as indicated by the diagonal bars. In the example, these are switching elements 7 and 8 in the uppermost stage S1 and switching elements 1 and 2 in the lowermost stage S7. Connections CO between the stages are indicated by lines. However, the removed switching elements do not require a connection, i.e. the corresponding connections can also be removed. This is indicated by connections in broken lines.

In both the second stages S2, S6 from the ingress and egress, i.e. counted from the outside of the matrix, there are two switching elements, i.e. switching element 4 and 8 in the second stage S2 from the top; switching element 1 and 5 in the second stage S6 from the bottom, which have no connection to the next outer stage S1, S7 and can accordingly also be removed. Again, the corresponding connections between stage S2 and the next inner stage S3 as well as between stages S6 and S5 can be removed as well. In the third stages S3, S5, each switching element has a connection to the second stage. However, four of the switching elements have only one connection. While those switching elements cannot be removed without loss of potential paths through the matrix, i.e. inferior non-blocking properties, they can be replaced by 2×1 switching elements without this disadvantage. This is indicated by a 1:2 below the corresponding switching elements. Finally, all switching elements in the center stage S4 have two connections on each side. Thus neither the switching elements nor their connections can be removed.

Figure 4:
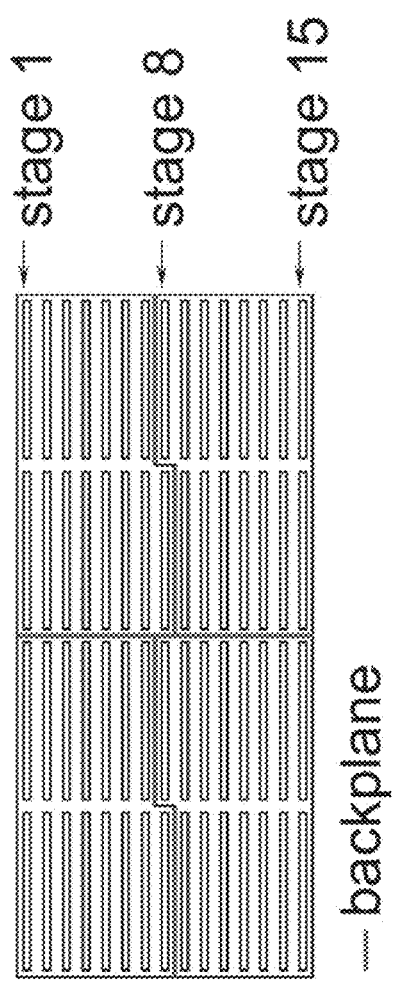
FIG. 4 shows a high level representation of a switching matrix

FIG. 4 shows a high level representation of a switching matrix which does not show individual switching elements and connections but only the stages of the Beneš network represented by horizontal bars in which the switching elements are disposed. Comprising 15 stages, the switching matrix is suitable for up to 256 ingress and egress ports each if the stages are equipped with 2×2 switching elements. However, due to size limitations and the required number of switching elements it is often difficult or impossible to arrange the switching matrix on a single circuit board. For example, a supporting rack for the switching matrix and/or the service box housing the switching matrix may limit the size of the circuit boards. This may particularly be the case if the service box houses further equipment like an MSAN apart from the MDFs accommodating connections to the cables. In such cases, it is required to subdivide the switching matrix into different sections. The sections can be interconnected via the backplane, i.e. a support holding the sections of the switching matrix. One example of such a subdivision is shown in FIG. 4.

It should be noted that the above described process of removing switching elements reduces the symmetry of the switching matrix. A regular Beneš network is point symmetric to the center point of the network, mirror symmetric to the central stage, and mirror symmetric to the plane perpendicular to the central stage through the center point, i.e. to the plane dividing the network perpendicular to the stages into two halves. Generally, further symmetries exist. When removing elements at least some symmetries are lost and, in contrast to a regular Beneš network with $2^n$ ingress and with $2^n$ egress ports, $2^n$ sections of the switching matrix can generally not be selected in such a way that they are identical in layout (with integers m<n). A reduced symmetry increases the costs of production as different boards need to be designed for the sections. If the switching matrix is subdivided into four sections as shown in FIG. 4, four different circuit boards might be required.

Figure 5:
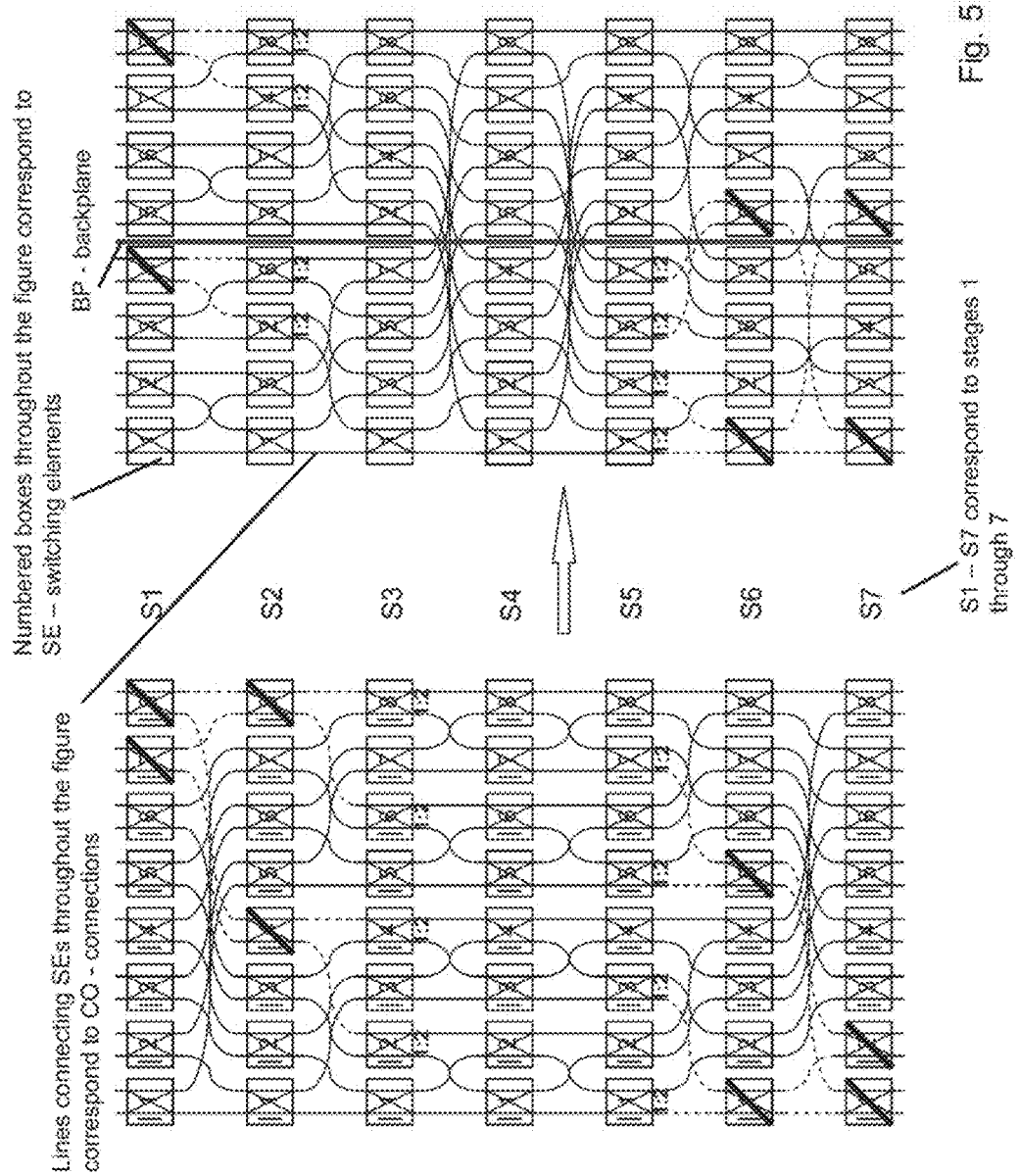
FIG. 5 shows a switching matrix with a first option for a rearrangement of the switching elements

Two attempts to resolve this problem are described using the example of the switching matrix in FIG. 5 which consists of switching elements SE and connections CO. As indicated by the vertical line the switching matrix is subdivided into two sections. Any connections between these sections are retained but need to be made across the borders of the sections, e.g. via a backplane BP on which the circuit boards for the sections are mounted or in another suitable way. Accordingly, at least one segment of such a connection is located outside a section, e.g. circuit boards, if the sections are disposed with a distance to each other.

As indicated by the arrow, the switching elements and connections can be rearranged to arrive at a switching matrix with the same functionality. The left part of FIG. 5 shows, as described before, a switching matrix with a minimum number of switching elements for the selected number of connections from the ports (here 12 in each outermost stage).

The upper part of FIG. 5 shows one option for achieving the same switching functionality with a different arrangement of the switching elements: it is possible to make identical arrangements in both sections in the first stage S1 by exchanging the positions of switching elements 4 and 7. This allows also having identical connections in both sections between stages S1 and S2. However, when comparing the changes required in stage S2 to retain the functionality it becomes obvious that this option is disadvantageous. While switching elements 4 and 8 can be totally omitted on the left side of FIG. 5, four 2×1 switching elements are required on the right side. In stage S3, 2×2 switching elements are now required instead of 2×1 switching elements. As a result, the optional rearrangement in stage S1 results both in a higher number of switching elements and more connections and optionally also in elements with more complicated functionality if the switching matrix shall have the same functionality as on the left side of the figure.

In the lower part of FIG. 5, a second option is shown in which only the arrangement of the switching elements is changed while the numbers and types of switching elements in total and in each of the stages S5-S7 are the same. The number of connections is unchanged compared to the left side of the figure. Accordingly, the above disadvantages are avoided. Also the arrangement of the switching elements in the two outermost stages S7 and S6 is identical in both sections. However, this leads to two other disadvantages: In stage S5 different types of switching elements are required in both sections and the arrangement of the connections in the sections is different. Thus different circuit boards would be required for both sections.

Figure 7:
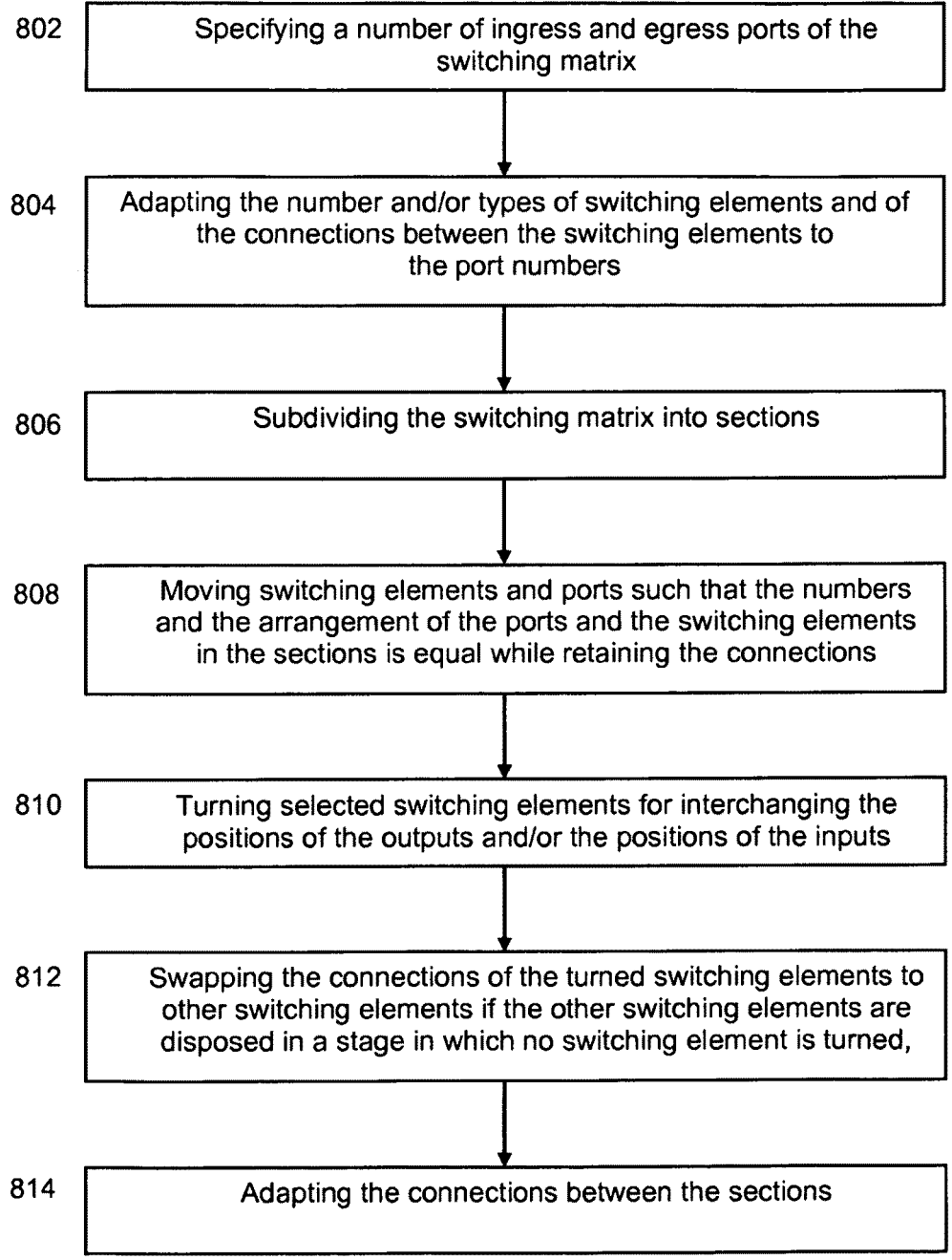
FIG. 7 shows a flow chart of the proposed method

With this background and referring to FIG. 7, a method is proposed to specify a switching matrix for connecting ingress ports to selected egress ports over a Beneš network. The Beneš network comprises a plurality of interconnected switching elements. Each switching element has at least one input and at least one output. Preferably, the switching matrix comprises 2×2 switching elements with 2 inputs and 2 outputs, optionally also 2×1 switching elements with 2 inputs and 1 output or with 1 input and 2 outputs. Such switching elements are easy to produce and allow any connection between a selected ingress and a selected egress port. The switching elements are adapted to connect a selected input to a selected output of the switching element. Depending on the type of the switching element, it is possible that there is only one or a plurality of simultaneous connections through it. For example, a 2×2 switching element can connect the inputs either in parallel or crossed to the outputs while a 2×1 switching element can alternately connect the inputs to the output.

The switching elements are arranged in stages, i.e. for every switching element in a selected stage there exists a specific first number of switching elements over which it can be connected to ingress ports and a specific second number of switching elements over which it can be connected to egress ports. The at least one input of any of the switching elements has a connection to an output of one of the switching elements in a preceding stage towards the ingress ports or to one of the ingress ports. The at least one output of any of the switching elements has a connection to an input of one of the switching elements in a subsequent stage towards the egress ports or to one of the egress ports. As was mentioned already before with respect to the terms ingress and egress as well as input and output, also the terms preceding and subsequent are merely used to specify the corresponding connections and do not imply a direction of the propagation of signals. Generally, a switching element in any selected stage is thus connected to switching elements in stages or ports adjacent to the selected stage.

In the proposed method, a number of ingress ports and a number of egress ports of the switching matrix are specified in step 802. At least one port number deviates from an integer power of 2 or—unless both numbers are equal—from the other number. Preferably, both numbers are identical, i.e. the method is especially suited in case of equal port numbers deviating from an integer power of 2. Correspondingly, a regular Beneš network with $2^n$ ingress ports and $2^n$ egress ports, where n is a natural number, would comprise at least one unused port when accommodating the switching matrix, i.e. the network of the switching matrix. This means that the number of connections and/or the number of switching elements can be reduced without loss of switching functionality, i.e. switching elements and/or connections connecting only to unused ports can be removed. Alternatively or in addition, switching elements can be replaced by switching elements with a smaller number of inputs or outputs. Accordingly, the number of switching elements and the connections between the switching elements are adapted to the port number in step 804. This means that the Beneš network of the switching matrix is a reduced Beneš network.

Figure 6:
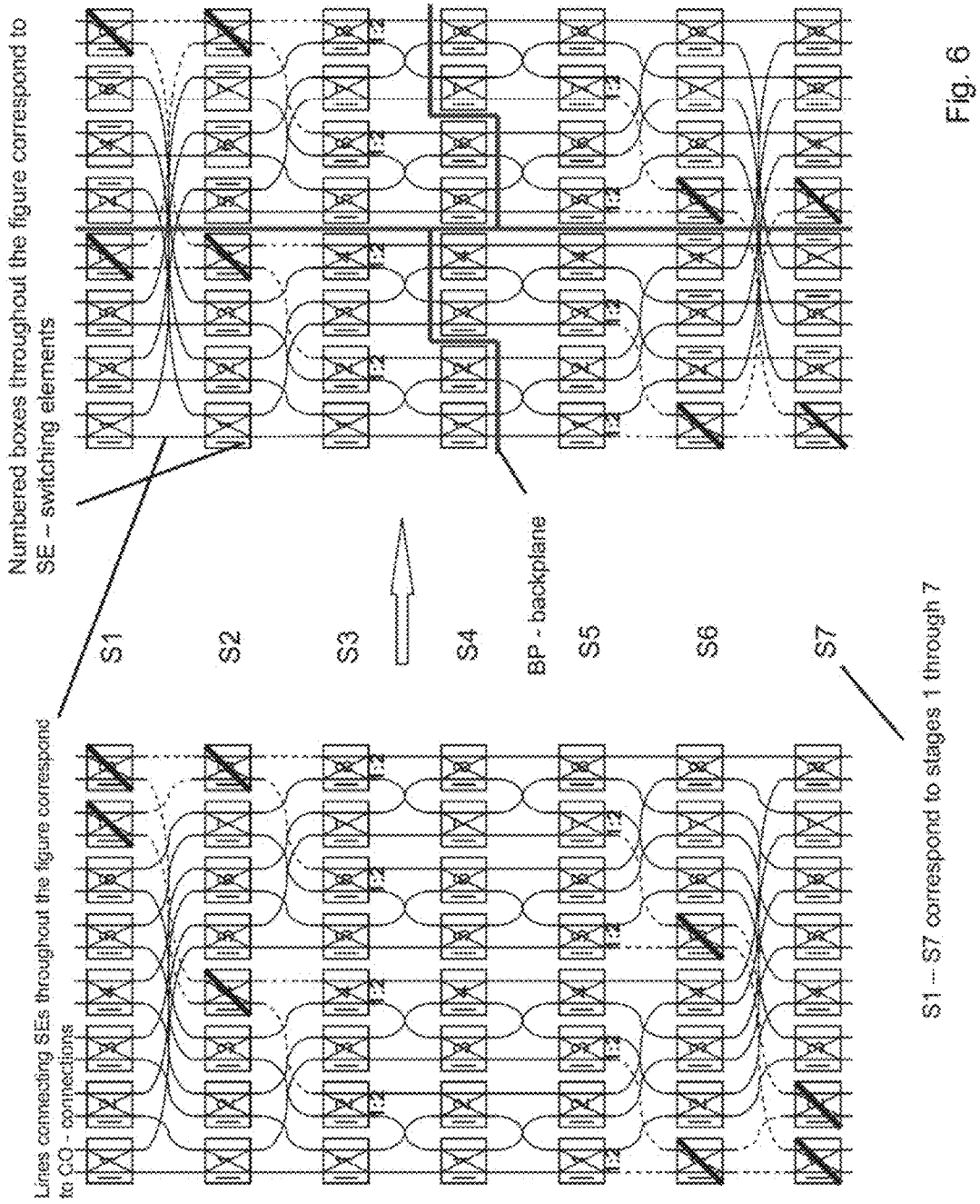
FIG. 6 shows a switching matrix with a further option for a rearrangement of the switching elements

The switching matrix is subdivided in step 806 into a plurality sections. The switching elements and the ports are moved in step 808 such that at least two of the sections comprise an equal number and arrangement of the ports and an equal number and arrangement of the switching elements. The connections between the switching elements are retained when moving switching elements and ports. Preferably, all sections comprise an equal number and arrangement of switching elements and ports after the steps of subdividing and moving are performed. If a switching matrix shall be fully subdivided into identical sections the number of ports and switching elements must be divisible accordingly, i.e. by the number of sections. The switching elements in the central stage of such a switching matrix are disposed on all sections, as shown in the examples of FIGS. 4 and 6. In this case, the central stage is split into a number of parts corresponding to the number of sections.

Moving the switching elements in this way while retaining the connections has the consequence that the connections within the sections are differently arranged. This can be resolved by step 810 of turning switching elements in at least one of the sections with equal number and arrangement of the switching elements such that the positions of the inputs are interchanged and/or the positions of the outputs are interchanged. In case of a 2×2 switching element this means that the positions of both inputs are interchanged and the positions of the outputs are interchanged. In case of a 2×1 switching element this means that the positions of both inputs are interchanged while the single output remains unchanged and for a 1×2 switching element both outputs are interchanged while the input is unchanged.

Turning of a switching element results only in an equal arrangement of the connections in different sections if the turned element is connected to a switching element in another section, i.e. if a connection with the turned element crosses the border of a section. Therefore, the step 810 of turning switching elements can be limited to these elements while other switching elements need not to be turned.

Optionally, the step of turning switching elements can be restricted to stages with connections crossing a border perpendicular to the stages, i.e. a vertical border in FIG. 6. This option simplifies the step of turning significantly. Furthermore, at most half of the switching elements in a stage need to be turned. If there are two corresponding, i.e. equally arranged, switching elements in different sections, only one of them needs to be turned. For simplicity it is advantageous to turn only switching elements in one selected section if the arrangement of connections shall be matched to a second section although it is in principle also possible to turn selected switching elements in both of these sections.

The connections of the turned switching elements to other switching elements are retained if the other switching elements are disposed in a stage in which at least one switching element is turned. In contrast, if the other switching elements are disposed in a stage in which no switching element is turned the connections of the turned switching elements to other switching elements are swapped in step 812. Often this will mean that the connections of the switching element are retained on one side, e.g. at the inputs, while the connections on the other side of the switching element, e.g. at the outputs, are swapped. Naturally, if a switching element has only a single input or a single output this connection is retained. The swapping avoids unnecessary crossings of connections and restores an equal arrangement of the connections compared to the corresponding element in another section which is not turned.

The steps of turning and swapping are performed in such a way that the arrangement of the connections within at least one section corresponds to the arrangement of the connections within at least one further section with an equal number and arrangement of the switching elements. Preferably, all sections have equal arrangements and connections after these steps.

Traditionally, a Beneš network is built up in such a way, that connections between the outer stages connect switching elements remotely located from each other, i.e. switching elements which may be in another section. In contrast, connections in the inner stages connect neighboring switching elements which are generally located in the same section unless the number of sections is too high. In this case, the turning of the switching elements can be limited to the outer stages, i.e. to a limited number of stages adjacent to the ports. If each stage is subdivided between two sections only, only switching elements in the two outermost stages need to be turned to achieve an equal arrangement of the connections within the sections. If each stage is subdivided between four sections, only switching elements in the three outermost stages need to be turned to achieve an equal arrangement of the connections within the sections because also connections between the 2nd and 3rd stage interconnect switching elements in different sections etc.

Turning switching elements as described above has the result, that the arrangement of connections between the sections will be different, e.g. the arrangement of the connections crossing the borders of sections is or becomes asymmetric. This is however not a significant disadvantage because connections crossing the borders need to be made via the backplane supporting the sections or via other connections between the sections. The corresponding connections between switching elements in different sections are therefore adapted accordingly in step 814 so that the connections before the step of subdividing are retained.

Generally, connections between two switching elements in different sections of the switching matrix can be subdivided into three segments. A first segment in a first section connects the first switching element to a first contact in this section. A second segment in a second section connects the second switching element to a second contact. In between both contacts is a third segment of the connection for connecting the contacts. Generally, the first segment will be on a circuit board carrying the first section of the switching matrix and the first contact. The second segment will be on the circuit board carrying the second section and the second contact. The third segment is generally part of the backplane or another connection between the circuit boards. According to the above procedure, any first and second segments can be arranged in the same way in the respective sections. Only the arrangements of any third segments crossing the borders between the sections differ. In other words, all sections comprise equally arranged contacts and equally arranged segments of the connections between the switching elements and the contacts.

It is advantageous if connections between different sections of the switching matrix exist only between a limited number of stages while the connections between other stages connect exclusively switching elements within the same section. In this way, the interconnection of the sections is simplified.

The above step of adapting the number of switching elements comprises preferably to specify an equivalent regular Bone network. The equivalent regular Beneš network comprises a number of ingress ports equal to the number of egress ports and being the smallest power of 2 which is at least equal to the number of ingress ports and at least equal to the number of egress ports specified for the switching matrix. Thus the regular Beneš network can accommodate the switching matrix, i.e. the network of the switching matrix, which is then a subsection of the regular Beneš network. In this way, the reduced Beneš network can be obtained in an easy way from the regular Beneš network by removal of connections and/or switching elements.

Optionally, the step of adapting can comprise to adapt the type of the switching element by replacing at least one switching element with a switching element with a smaller number of inputs and/or a smaller number of outputs, e.g. a 2×2 switching element by a 2×1 or 1×2 switching element. This option can considerably reduce the production costs, in particular if a 2×2 switching element comprises two relays while a 2×1 or 1×2 switching element comprises only a single relay.

Due to the retaining or swapping of connections, the step of moving switching elements changes only their position within a stage. To obtain identical arrangements of the switching elements within the sections it can in particular be required to move a switching element within a stage into a different section. Preferably, the step of moving is performed only for switching elements in the stages adjacent to ports or in a limited number of stages adjacent to the ports. With an increasing number of sections, it may be required to move switching elements in an increasing number of the next inner stages.

If turned switching elements are connected to ports of the matrix, the position of the ports is exchanged. Accordingly, it is preferable if the designations of ports are adapted, e.g. swapped, in order to have a systematic arrangement of the port designations. In view of such optional adaptations, connections of a turned switching element to ports can either be retained or swapped.

Preferably, pairs of interconnected switching elements are turned in adjacent stages of a section. This allows an effective execution of the above method as also the interconnection of both elements is rearranged accordingly in this step. Turning pairs of interconnected switching elements is particularly effective if the other connections of the turned pair of switching elements between the stages, in which the elements are disposed, are connections over a border of sections, especially over a border perpendicular to the stages.

It should finally be noted that the step of subdividing in the above method can be performed before the step of adapting the number of switching elements and connections. This is for example advantageous if the stages are subdivided into n sections and the number of ingress or egress ports deviates from 2n. Instead of splitting a 2×2 switching element it can be replaced in this case by two 1×2 switching elements, one in each section. While this increases the number of switching elements compared to the number obtainable without a subdivided matrix the method is still applicable. Similarly, it may be necessary to perform the step of moving before the step of subdividing.

Once a switching matrix is specified as described above, the sections of the switching matrix and the backplane can be produced according to the specification and assembled to create the switching matrix. The sections specified according to any of the different embodiments of the method as described above can be cost-effectively produced.

The described method has the biggest advantages, if all sections of a switching matrix are equal. Nonetheless, the advantages can often at least partly be achieved if only some sections are equal or if sections are only substantially equal. In particular, it is possible that selected switching elements are omitted in a section which was specified as described above, e.g. if ports are not needed. It is also possible that selected additional components are disposed in a section as long as the switching matrix is specified as described above.

The method can also be embodied in a program comprising code for performing the steps of the method.

An example of the above method is now described with respect to FIG. 6. As already mentioned, the left side of the figure shows a Beneš network with the central stage S4. In accordance with step 802 the number of connections from ports to the uppermost stage S1 and of connections to ports from the lowermost stage S7 is specified to 12 each. According to step 804, the number and type of switching elements is adapted accordingly by removing selected elements or by replacing 2×2 with 2×1 elements.

Subsequently it is specified that the matrix is subdivided into 4 sections separated by bold lines on the right side of FIG. 6 which represent the borders of the sections. Switching elements in the central stage are in all 4 sections to avoid that they need to be functionally split. By moving elements within and between the stages it is ensured that the arrangement of the switching elements and of the external connections of all sections is equal.

However, this does not lead to equal arrangements of the connections in all sections. For this purpose switching elements are turned by 180° around the vertical axis, i.e. the axis perpendicular to the stages. The orientation of a switching element is indicated by a vertical line, which is either on the left side or on the right side (see e.g. the elements in the 2nd stages 82, S2, S7). It should be noted that turning 2×2 switching elements by 180° results in identically oriented switching element, in particular as the inputs can be connected either in parallel or crossed to the outputs. Also the turning of 2×1 switching elements by 180° results in identically oriented switching elements. Nonetheless, the turning has an effect on the connections which are rearranged due to the turning. As the arrangement of the connections and switching elements in the inner stages S3-S5 is symmetrical from the start only elements in the outer stages S1, S2, S6 and S7 need to be turned.

In line with the principles outlined above, only the switching elements in two of the sections, i.e. the upper right and the lower left section, are turned in the outer stages S1, S2, S6 and S7. The turning is performed pair wise, i.e. two neighboring interconnected switching elements in two adjacent stages are turned together, for example switching element 2 in stage S1 and switching element 5 in stage S2. Finally, for each turned switching element in stage S2 both connections to the switching elements in stage S3 are swapped, i.e. interchanged. In the same way, the connections of the turned switching elements in stage S6 to switching elements in stage S5 are swapped. As the turning of the switching elements by 180° interchanges the positions of both inputs or outputs, the swapping of the connections ensures that the arrangement of the connections is unchanged by interchanging them, too.

The results of these steps is that both the arrangement of the connections and the arrangement of the switching elements is identical in all four sections except for those connections leading to another section, e.g. via the backplane. However, connections between the sections of the switching matrix are made separately in different steps of the production such that asymmetries of these connections do not affect the production costs of the sections and thus the switching matrix.

An advantageous switching matrix can be used for connecting selected ingress ports to selected egress ports over a Beneš network. The Beneš network comprises a plurality of interconnected switching elements. Each switching element has at least one input and at least one output and is adapted to connect a selected input to a selected output of the switching element. The switching elements are arranged in stages. The at least one input of any of the switching elements has a connection to the at least one output of one of the switching elements in a preceding stage or to one of the ingress ports. The at least one output of any of the switching elements has a connection to the at least one input of one of the switching elements of a subsequent stage or to one of the egress ports.

It is proposed that the switching matrix has a first number of ingress ports and a second number egress ports. At least one of said numbers deviates from an integer power of 2 or from the other number. The number of switching elements and the number of connections between the switching elements are adapted to the numbers of ports. The switching matrix is subdivided into a plurality sections such that at least two of the sections comprise an equal number of switching elements and an equal number of ports. The arrangement of the ports and the switching elements in said sections is equal. Also the arrangement of the connections within the sections is equal. Deviations in the arrangement of connections are limited to connections between the sections.

The switching matrix can be specified according to any embodiments of the method as described above. In particular, it is advantageous if the number of ingress ports is equal to the number of egress ports and if all sections comprise an equal number and arrangement of ports and switching elements.

The invention can also be embodied in a circuit board for a section of the switching matrix. The circuit board comprises the connections within at least one of the sections. In this way positions for the switching elements, in particular contacts for the inputs and outputs, are defined on the circuit boards as well as contacts for connections to other circuit boards. Correspondingly, the above switching matrix can be manufactured by disposing the switching elements at the corresponding positions and attaching the connections to the contacts. It should be noted that the same circuit board can be used for different embodiments of the switching matrixes, e.g. if not all positions are equipped with switching elements but, depending on the number of required ports, some switching elements are omitted. In this way, the above advantages in the design of the circuit board are maintained while a flexible and cost-effective production is possible.

The above embodiments admirably achieve the objects of the invention. However, it will be appreciated that departures can be made by those skilled in the art without departing from the scope of the invention which is limited only by the claims.

The invention claimed is:

1. A method to specify a switching matrix for connecting selected ingress ports to selected egress ports over a Beneš network, wherein the Beneš network comprises a plurality of interconnected switching elements, each switching element has at least one input and at least one output and is configured to connect a selected input to a selected output of the switching element, wherein the switching elements are arranged in stages and wherein the at least one input of any of the switching elements has a connection to the at least one output of one of the switching elements in a preceding stage or to one of the ingress ports, and wherein the at least one output of any of the switching elements has a connection to the at least one input of one of the switching elements in a subsequent stage or to one of the egress ports, characterized by the steps of:
    specifying a first number of ingress ports and a second number of egress ports of the switching matrix, wherein at least one of said numbers deviates from: an integer power of 2; wherein the first number of ingress ports differs from the second number of egress ports;
    configuring the number of the switching elements and the number of the connections between the switching elements to the specified numbers of ports;
    subdividing the switching matrix into a plurality sections;
    moving the switching elements and the ports such that at least two of the sections comprise an: equal number and arrangement of the switching elements and an equal number and arrangement of the ports, wherein the connections are retained;
    in at least one of the at least two sections, turning switching elements having a connection to a switching element in another of the plurality of sections such that the positions of the inputs are interchanged and/or the positions of the outputs are interchanged;
    retaining the connections of the turned switching elements to other switching elements if the other switching elements are disposed in a stage in which at least one switching element is turned and swapping the connections of the turned switching elements to other switching elements if the other switching elements are disposed in a stage in which no switching element is turned;
    wherein the steps d turning and swapping are performed such that the arrangements of the connections within the at least two sections correspond to each other.

2. The method according to claim 1, wherein the step of configuring comprises to specify an equivalent regular Beneš network, wherein the regular Beneš network comprises a number of ingress ports being the smallest power of 2 which is at least equal to the first number of ingress ports and at least equal to the second number of egress ports, and wherein the switching matrix is a subsection of the regular Beneš network.

3. The method according to claim 1, wherein the switching elements comprise 2×2 units with 2 inputs and 2 outputs.

4. The method according to claim 1, wherein the switching elements comprise relays.

5. The method according to claim 1, wherein said step of configuring comprises replacing at least one switching element with a switching element with a smaller number of inputs and/or a smaller number of outputs.

6. The method according to claim 1, wherein said step of moving is performed only for switching elements in a limited number of stages adjacent to ingress or egress ports.

7. The method according to claim 1, wherein the turning of switching elements is restricted to stages with connections crossing a border of a section, wherein the border is perpendicular to the stages.

8. The method according to claim 1, wherein pairs of interconnected switching elements are turned in adjacent stages of a section.

9. A switching matrix for connecting selected ingress ports to selected egress ports over a Bone{network, wherein the Beneš network comprises a plurality of interconnected switching elements, each switching element having at least one input and at least one output and being configured to connect a selected input to a selected output of the switching element, wherein the switching elements are arranged in stages and wherein the at least one input of any of the switching elements has a connection to the at least one output of one of the switching elements in a preceding stage or to one of the ingress ports, and wherein the at least one output of any of the switching elements has a connection to the at least one input of one of the switching elements of a subsequent stage or to one of the egress ports wherein the switching matrix has a first number of ingress ports and a second number egress ports, wherein at least one of said numbers deviates from an integer power of 2; wherein the first number of ingress ports differs from the second number of egress ports;

the number of switching elements and the number of connections between the switching elements are configured to the numbers of ports;

the switching matrix is subdivided into a plurality sections such that at least two of the sections comprise an equal number of switching elements and an equal number of ports, wherein the arrangement of the ports and the switching elements in said sections is equal;

the arrangement of the connections within the sections is equal; and deviations in the arrangement of connections are limited to connections between the sections.

\* \* \* \* \*

UNITED STATES PATENT AND TRADEMARK OFFICE
CERTIFICATE OF CORRECTION

PATENT NO.      : 8,737,391 B2                                    Page 1 of 1
APPLICATION NO. : 12/672618
DATED           : May 27, 2014
INVENTOR(S)     : Mueller et al.

It is certified that error appears in the above-identified patent and that said Letters Patent is hereby corrected as shown below:

In the Specification

Column 1, Line 50, delete "customers" and insert -- customer's --, therefor.

Column 2, Line 32, delete "paints." and insert -- points. --, therefor.

Column 7, Line 10, delete "stage 52" and insert -- stage S2 --, therefor.

Column 7, Line 15, delete "stages 53," and insert -- stages S3, --, therefor.

Column 11, Line 31, delete "Bone" and insert -- Beneš --, therefor.

Column 12, Line 62, delete "82, S2," and insert -- S2, --, therefor.

In the Claims

Column 15, Line 18, Claim 9, delete "Bone{network," and insert -- Beneš network, --, therefor.

Column 16, Line 6, Claim 9, delete "wherein" and insert -- wherein: --, therefor.

Signed and Sealed this
Twenty-eighth Day of October, 2014

Michelle K. Lee
*Deputy Director of the United States Patent and Trademark Office*